United States Patent [19]

Shaffer

[11] Patent Number: 4,941,787

[45] Date of Patent: Jul. 17, 1990

[54] LOCKING MECHANISM FOR FASTENER

[75] Inventor: James Shaffer, Maitland, Fla.

[73] Assignee: Consulier Industries, Inc., Riviera Beach, Fla.

[21] Appl. No.: 417,640

[22] Filed: Oct. 5, 1989

[51] Int. Cl.⁵ ............................................. F16B 39/24
[52] U.S. Cl. ................................... 411/136; 411/150; 411/155
[58] Field of Search ............... 411/130, 131, 136, 143, 411/149, 150, 154–156, 162, 169, 399, 533, 545

[56] References Cited

U.S. PATENT DOCUMENTS

| | | | |
|---|---|---|---|
| 259,665 | 6/1882 | Broomall et al. | 411/155 |
| 1,083,471 | 1/1914 | Walton et al. | 411/149 |
| 3,241,423 | 3/1966 | Davis | 411/399 |
| 3,241,589 | 3/1966 | Enders | 411/136 |
| 3,434,520 | 3/1969 | Bedford, Jr. | 411/155 |

*Primary Examiner*—Neill R. Wilson
*Attorney, Agent, or Firm*—Warren L. Franz

[57] ABSTRACT

A bolt shank and washer have contiguous respective elliptical and circular surfaces that interact to impart an undulated axial distortion to the washer in a circumferentially running sinusoidal way, so that the washer acts in spring-like fashion to lock the bolt in its tightened position. The elliptical surface is tapered outwardly toward the bolt head to give an increased spring constant with increased tightening.

3 Claims, 1 Drawing Sheet

LOCKING MECHANISM FOR FASTENER

This invention relates to a locking mechanism for a fastener; and in particular, to a mechanism for imparting spring-like locking action between a washer and a fastener by interaction of the geometry of the washer with the geometry of an encompassed fastener shank.

BACKGROUND OF THE INVENTION

Fasteners such as screws and bolts are well known for use in joining contiguous objects. Such elements have longitudinal shanks of circular cross-section topped at one end by a head. The head may have a round, square or hexagonal cross-section with a lateral dimension greater than that of the shank diameter. The shank is threaded along its length to engage either directly with matching internal threads of a bore, as in the case of a screw, or with matching internal threads of a nut received at the free end of the shank, as in the case of a bolt. Threading may extend the full length of the shank or begin after an unthreaded interval or "lag" at a distance below the head.

In a typical screw fastening procedure, a screw is threaded partially into the objects to be connected to mesh with matching threads of a bore either previously created or created by the rotating action of the screw itself. In a typical nut and bolt fastening procedure, a bolt is placed into one end of aligned predrilled bores of adjacent objects until a free end, threaded portion of its shank protrudes from the opposite end of the bores, with the head acting as a stop to limit further inward movement. An internally threaded nut is then brought over the free end of the shank and rotated toward the head to clamp the objects between the bolt head and the nut.

It is known to taper a circular cross-sectioned screw or bolt outwardly from an upper portion of the shank to the head to provide a conical transition between the shank and the head for the purpose of matching the underside of the head to the contour of a correspondingly tapered larger diameter section or counterbore at the insertion end of a bore. It is also known, especially in connection with screws, to taper a threaded lower portion of the shank down to a point at the free end in order to achieve a self-tapping capability.

Ring elements, commonly called "washers" are frequently used adjacent the underside of the head and/or the head side of the nut. These may be used for spacing or to prevent the head or nut from marring the surface of one or both of the objects being fastened. If a fastener might have a tendency to work itself loose, a locking-type washer or similar element may be used in spring-like manner to impart axial tension between the head and nut. A typical lock washer for use where vibration might otherwise unthread a nut from a fastener shank, is a split ring washer which has one end elevated slightly relative to the other in a single turn, coil spring configuration to impart axial tension when the washer is axially compressed between the head or nut and the fastened objects. The spring constant of such a lock washer remains approximately constant when compressed, and provides a generally linear increase in tension force over the region of interest as the fastener is tightened.

SUMMARY OF THE INVENTION

It is an object of the present invention to provide a locking mechanism for a fastener utilizing the interaction of a geometry of a closed loop washer element with a different geometry of an encompassed fastener shank to provide a spring-like locking action and, especially, a locking action wherein the spring constant increases with increased tightening of the fastener.

It is another object of the invention to provide a locking mechanism for a fastener wherein an adapter fitted to a conventional fastener shank imparts a locking capability to an ordinarily non-locking ring washer.

In one aspect of the invention, a longitudinal shank of a fastener has an elliptical cross-section portion adjacent its head that reacts at diametrically opposed points along a major axis of the elliptical section with diametrically opposed points on the inside circular edge of a ring-shaped washer to cause the washer to become undulated with a circumferentially periodic, axial distortion of general sinusoidal form. This distortion acts in spring-like fashion to assert locking axial tension on the fastener. The threaded lower portion of the fastener retains a conventional circular cross-sectional shape.

In a preferred embodiment of the invention, described in greater detail below, the elliptical cross-section portion of the fastener shank is tapered outwardly toward the head. This conical configuration causes the amplitude of the sinusoidal pattern to increase as the washer is forced up the taper, the more the fastener is tightened.

In another aspect of the invention, a locking mechanism for a conventional fastener having a shank of circular cross-section used with a circular annular washer is obtained by the use of an adapter which has an inner circular bore to fit over the shank adjacent the head and an outer conical surface of elliptical cross-section that interacts with the washer to cause an undular axial distortion.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DESCRIPTION OF PREFERRED EMBODIMENTS

Figure 1:
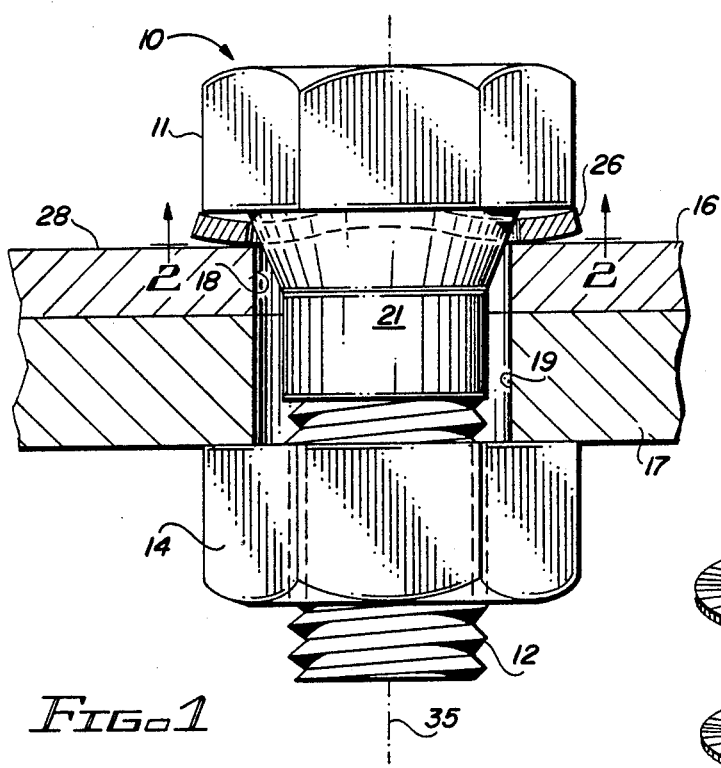
FIG. 1 is a cross-section view showing two objects joined together by a fastener incorporating a locking mechanism in accordance with the invention.
Figure 2:
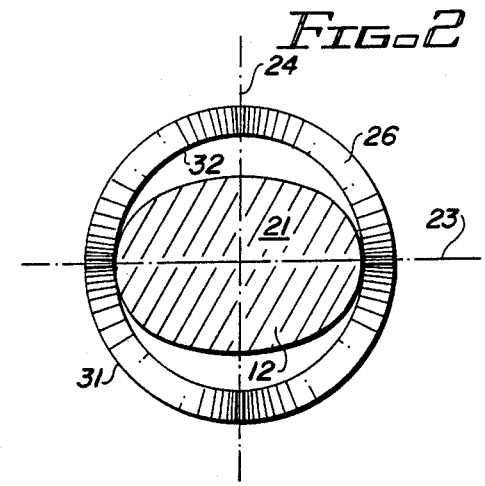
FIG. 2 is a section view of the fastener of FIG. 1 taken along the line 2—2 of FIG. 1.

As shown in FIGS. 1 and 2, a fastener in the form of a bolt 10 having a head 11 formed at the top end of a longitudinally extending shank 12 is interengaged with a nut 14 to fasten objects 16, 17 together by passage of the shank 12 through aligned bores 18, 19. The shank comprises coaxially aligned upper and lower portions 21, 22, the upper portion 21 having a generally elliptical cross-section with major and minor axes 23, 24 (FIG. 2)

and the lower portion 22 being of conventional circular cross-section of given outside diameter. The upper portion 21 is outwardly tapered in the direction of the head 11. The lower portion 22 is externally threaded at least partially along its length to mesh at its free, lower end with corresponding internal threads of the nut 14. The head 11 of the bolt 10, as shown, is of hexagonal cross-section but could just as well be round or square. It has a lateral dimension which is greater than the outside diameter of both the upper and lower portions 21, 22 of the shank 12. The bolt 10 is chosen so that the aligned bores 18, 19 have inside diameters less than the lateral dimension of the head 11 but greater than the outside diameter of at least a part of the upper portion 21 and all of the lower portion 22 of the shank 12.

Figure 3:
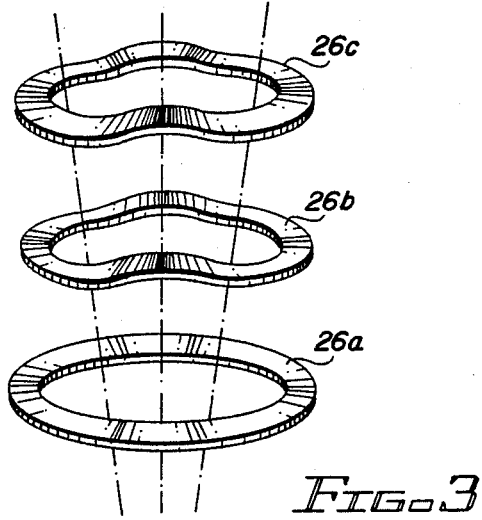
FIG. 3 is a schematic view helpful in understanding the increasing spring constant feature of the invention.

The free, threaded lower end of the bolt 10 is inserted into the aligned bores 18, 19 so that a portion thereof protrudes beyond the lower opening of bore 19. A closed loop washer 26 (see washer configuration 26a in FIG. 3) is interposed to circumscribe the shank 12, between the underside of the head 11 and a facing marginal portion around the top opening of bore 18 of the top surface 28 of the object 16. Washer 26 is of annular ring configuration, as shown in FIG. 2, with outer and inner concentric circular edges 31, 32. The inside diameter of the washer 26 (i.e. the diameter of the edge 32) is greater than the outside diameter of the lower portion 22 of the shank 12, but less than the lateral dimension of the head 11. The inside diameter of the washer 26 is also less than the outside diameter at the major axis 23, but greater than the outside diameter at the minor axis 24, of the elliptical cross-section of the portion 21 for at least part (and, preferably, for the majority) of the longitudinal axial extent of the taper. The cross-section of the washer 26 is uniformly outwardly tapered in the radial direction, with the thickness (axial dimension) of the washer 26 being less at its inside diameter than at its outside diameter.

In operation, as the nut 14 is threaded onto the lower portion 22 of the bolt 10, the head 11 is tightened against the surface 28 of object 16, forcing diagonally opposite points on the inner circular edge 32 of the flat washer 26 into contact with diagonally opposite points along the major axis 23 of the elliptical cross-section of the portion 21 of the shank 12. The reaction of the circular geometry of the edge 32 of the washer 26 against the elliptical geometry of the conical surface of the shank portion 21 causes the washer 26 to become distorted in the direction of the shank axis 35 in a circumferentially periodic, undulated fashion, to impart a sinusoidal perturbation to the normally flat ring. Such perturbation acts in a spring-like manner to impart axial tension between the bolt 10 and nut 14, to lock the fastener 10 within the bores 18, 19. As shown by the successive washer configurations 26a–c in FIG. 3, as the washer 26 is forced up the expanding major axis dimension of the elliptical taper of shaft portion 21 with increased tightening of the fastener 10, the amplitude of the undular distortion increases, which results in a corresponding increase in the spring constant of washer 26 in the spring-like locking action.

Figure 5:
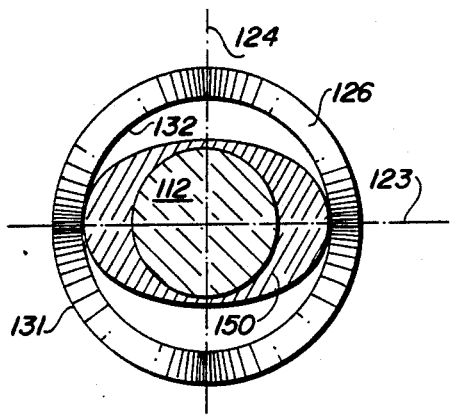
FIG. 5 is a section view of the fastener of FIG. 4 taken along the line 4—4 of FIG. 4.
Figure 6:
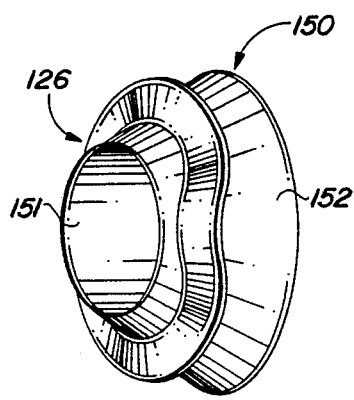
FIG. 6 is a perspective view of the adapter and distorted washer elements of FIGS. 4 and 5.
Figure 4:
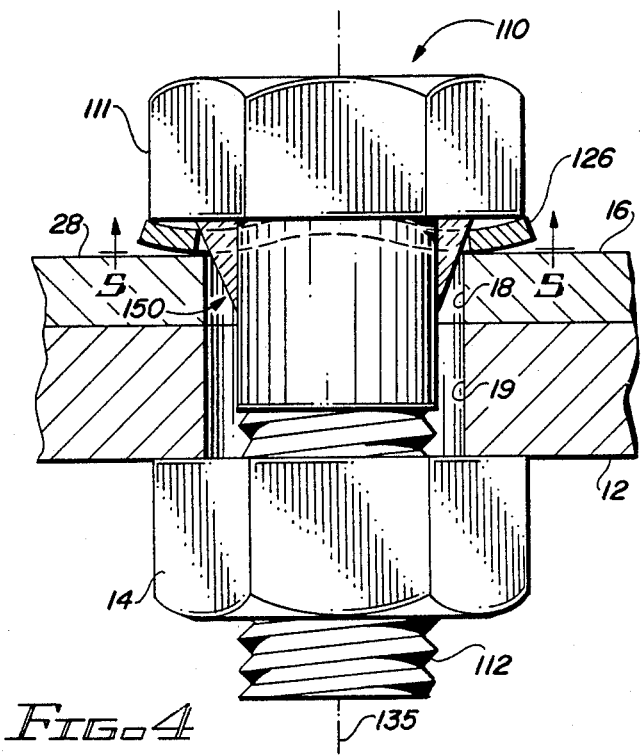
FIG. 4 is a view, like that of FIG. 1, showing a conventional fastener with an adapter utilized to achieve a locking mechanism in accordance with the invention.

A locking mechanism for a conventional bolt 110 of circular cross-sectioned shank 112 used with a circular annular, closed loop ring washer 126 is shown in FIGS. 4–6. This embodiment employs an adapter in the form of a ferrule or sleeve 150 having an internal circular cross-sectioned axial bore 151 of inside diameter slightly larger than the outside diameter of the circular shank 112, and an external, outwardly tapered elliptical cross-sectioned surface 152 about which the washer 126 is received. The shown bolt 110 is of conventional threaded lag bolt configuration, having a head 111 of lateral dimension greater than the outside diameter of the shank 112. The washer 126 has an inner circular edge 132 of diameter greater than the outside diameter of the shank 112. The inside diameter of the washer 126 (i.e. the diameter of edge 132) is less than the outside diameter of the ferrule 150 at its section major axis 123, but greater than the diameter of ferrule 150 at its section minor axis 124, preferably over a majority of the longitudinal axial extent of the ferrule 150.

The bolt 110 is received, as with the bolt 10, with its shank 112 inserted into the aligned bores 18, 19 of objects 16, 17, and the nut 14 is threadingly interengaged with a protruding free end of the shank 112 to draw the underside of the head 111 against the washer 126 and the facing surface 28. The adapter 150 is located annularly about the shank 112 in position adjacent the head 111 to present an elliptically cross-sectioned conical taper having diagonally opposite points of the surface 152 on major axis 123 against which diagonally opposite points of the inner edge 132 of the washer 126 react. As the bolt 110 is tightened, the interaction of the different geometries of the circular edge 132 and the elliptical surface 152 distorts the washer 126 undularly in the direction of axis 135 to give a sinusoidal waveform running circumferentially of the washer 126. This circumferentially periodic undulation acts in spring-like manner to lock the bolt 110 in its tightened position.

As with bolt 10, described previously, the amplitude of the sinusoidal distortion increases with further tightening of the bolt 110 from a normally flat contour (see washer position 26a in FIG. 6) to a severely axially distorted contour (see washer position 26c in FIG. 6). And, just as with the fastening arrangement of bolt 10, the effective spring constant of the undulation of washer 126 in the bolt 110 arrangement increases with increased tightening of the bolt.

It will be appreciated that the undulations are induced by the interaction of the respective elliptical (i.e. non-circular) and circular geometries of the shank (or shank adapter) and washer elements, and that a similar interaction is achieved by exchanging the geometries of those elements, with the shank (or shank adapter) outer surface having the circular cross-section and the washer inner edge having the elliptical shape. It will also be appreciated that the principles of the invention are applicable to bolt and screw fasteners of all types, whether their shanks be tapered or untapered, lagged or unlagged. Moreover, those skilled in the art to which the invention relates will understand that various other substitutions and modifications may also be made to the described embodiments, without departing from the spirit and scope of the invention as defined by the claims below.

I claim:

1. A locking mechanism comprising:
    a fastener including a longitudinal shank having a lower threaded portion of circular cross-section with an outside diameter and an upper portion having an upwardly and outwardly tapered conical outer surface of elliptical cross-section having a major axis diameter and a minor axis diameter, a head joining a top end of said shank; and
    a closed loop, annular ring washer having a circular inner edge of inside diameter greater than said outside diameter of said shank lower portion, and greater than said minor axis diameter of said shank upper portion, but less than said major axis diameter of said shank upper portion;

said inner edge of said washer and said cross-section of said upper portion being relatively configured, dimensioned and adapted so that when said bolt shank is inserted into an object with said inner edge of said washer surrounding said shank between said head and said object, and said head is drawn toward said object by means of said threaded portion to tighten said fastener, said washer is deformed axially longitudinally of said shank in circumferential sinusoidally periodic manner by reaction of said inner edge with said outer surface to impart a spring-like locking tension between said head and said object.

2. A locking mechanism comprising:

a fastener including a longitudinal shank having a lower threaded portion of circular cross-section with an outside diameter and an upper portion having an upwardly and outwardly tapered conical outer surface of elliptical cross-section having a major axis diameter and a minor axis diameter, a head joining a top end of said shank; and a closed loop, annular ring washer having a circular inner edge of inside diameter greater than said outside diameter of said shank lower portion, and greater than said minor axis diameter of said shank upper portion, but less than said major axis diameter of said shank upper portion, for a majority of said longitudinal extent of said outer surface;

said inner edge of said washer and said cross-section of said upper portion being relatively configured, dimensioned and adapted so that when said bolt shank is inserted into an object with said inner edge of said washer surrounding said shank between said head and said object, and said head is drawn toward said object by means of said threaded portion to tighten said fastener, said washer is deformed axially longitudinally of said shank in circumferential sinusoidally periodic manner by reaction of said inner edge with said outer surface to impart a spring-like locking tension between said head and said object whose spring constant increases with increased tightening of said fastener.

3. A locking mechanism comprising an adapter in combination with a fastener and a washer, said fastener including an elongated shank of circular cross-section having a threaded portion and an outside diameter, and a head joining a top end of said shank and having a lateral dimension greater than said outside diameter;

said washer being a closed loop, annular ring having a circular inner edge of inside diameter greater than said outside diameter but less than said lateral dimension; and said adapter being a ferrule having an axial length less than the length of elongation of said shank, an axial bore of circular cross-section with an inside dimension greater than said inside diameter but less than said lateral dimension, and an outside upwardly and outwardly tapered conical surface of elliptical cross-section with a major axis diameter greater than said inside diameter and a minor axis diameter less than said inside diameter;

said inner edge of said washer and said cross-section of said conical surface being relatively configured, dimensioned and adapted so that when said adapter is received below said head or on said fastener with said shank through said axial bore with said shank inserted into an object with said inner edge of said washer surrounding said shank between said head and said object, and said head is drawn toward said object by means of said threaded portion to tighten said fastener, said washer is deformed axially longitudinally of said shank in circumferential sinusoidal periodic manner to impart locking tension between said head and said object.

* * * * *